United States Patent
Schönenbach et al.

(10) Patent No.: US 6,263,627 B1
(45) Date of Patent: Jul. 24, 2001

(54) MOTOR-VEHICLE GLASS-MOUNT ASSEMBLY

(75) Inventors: Heinz Schönenbach, Remscheid; Heinrich Krieg, Neureichenau; Martin Windpassinger, Hauzenberg, all of (DE)

(73) Assignee: Parat Automotive Schonenbach GmbH + Co. KG, Remscheid (DE)

( * ) Notice: Subject to any disclaimer, the term of this patent is extended or adjusted under 35 U.S.C. 154(b) by 0 days.

(21) Appl. No.: 09/514,616

(22) Filed: Feb. 28, 2000

(30) Foreign Application Priority Data

Mar. 3, 1999 (DE) .............................. 199 09 139
May 21, 1999 (DE) .............................. 199 23 544

(51) Int. Cl.⁷ .................. B60J 1/00; B60J 10/02
(52) U.S. Cl. ............... 52/208; 52/204.591; 52/204.597; 52/716.5; 52/716.2; 52/717.05; 296/96.21; 296/84.1; 296/146.15; 296/201
(58) Field of Search ............... 52/716.5, 716.6, 52/716.7, 716.8, 716.2, 717.05, 204.591, 204.597, 204.53, 204.71, 204.72, 208; 296/96.21, 84.1, 146.15, 201

(56) References Cited

U.S. PATENT DOCUMENTS

| | | | |
|---|---|---|---|
| 4,487,448 | * 12/1984 | Griffin | 296/146.15 |
| 4,611,850 | * 9/1986 | Fujikawa | 296/201 |
| 4,723,809 | * 2/1988 | Kida et al. | 296/96.21 |
| 4,754,586 | * 7/1988 | Fujikawa | 52/208 |
| 4,768,319 | * 9/1988 | Derner | 52/204.591 X |
| 4,905,432 | * 3/1990 | Romie | 296/201 X |
| 5,062,248 | * 11/1991 | Kunert | 296/84.1 X |
| 5,096,255 | * 3/1992 | Leischner | 296/201 |
| 5,344,205 | * 9/1994 | Yada et al. | 52/204.597 X |
| 5,475,956 | * 12/1995 | Agrawal et al. | 296/96.21 X |
| 5,529,366 | * 6/1996 | Gold | 296/96.21 |

FOREIGN PATENT DOCUMENTS

| | | | |
|---|---|---|---|
| 3604364 | * 8/1986 | (DE) | 296/146.15 |
| 195 26 283 | 1/1997 | (DE) . | |
| 197 24 592 | 10/1998 | (DE) . | |
| 678891 | * 9/1952 | (GB) | 296/96.21 |
| 60-219181 | * 11/1985 | (JP) | 296/145.15 |

\* cited by examiner

Primary Examiner—Laura A. Callo
(74) Attorney, Agent, or Firm—Herbert Dubno; Andrew Wilford

(57) ABSTRACT

An outside edge of a glass pane and a coextensive inside edge of a frame are connected together by a glass-mount assembly having a T-section outer seal strip fixed to an inner face of one of the edges and having an inwardly projecting T-leg and a U-section inner seal strip fixed to the other edge and forming an outwardly open groove snugly receiving the T-leg, and a plurality of screw fasteners each having a part bearing outward on the inner seal strip and a shank engaged in the T-leg of the inner seal strip. The outer strip is provided with a plurality of inwardly open threaded sleeves each receiving a respective one of the shanks. These sleeves can be part of one or more metal reinforcement profiles imbedded in the outer strip. Alternately the screw fasteners are self-tapping screws and the outer seal strip is formed with a plurality of inwardly open blind bores each receiving a respective one of the screws. Either way, the inner strip is formed with a plurality of counterbored through-going holes through each of which passes a respective one of the screws. The inner strip can be provided with an imbedded metallic reinforcement through which the screws pass. The outer-strip reinforcement is exposed at an inner face of the T-leg. In addition the inner-strip reinforcement is inwardly exposed and directly engaged by the screw parts, normally screw heads.

20 Claims, 7 Drawing Sheets

MOTOR-VEHICLE GLASS-MOUNT ASSEMBLY

FIELD OF THE INVENTION

The present invention relates to an assembly for mounting a window glass in a motor vehicle. More particularly this invention concerns such an assembly used for mounting the glass pane in a hatchback door, sun roof, or the like.

BACKGROUND OF THE INVENTION

The glass of a motor-vehicle window or sunroof must be mounted solidly enough that it can withstand the buffeting of the high-speed winds created during road travel, and it also must seal very tightly. Furthermore it must present a neat appearance and have a low profile for minimal wind resistance.

A typical system is described in German patent 197 24 592 of L. Hartmann imbeds the inside edge of the normally metallic frame and the outside edge of the glass pane in a polyurethane seal strip that is formed in situ around the parts. To this end the edges of the frame and pane must be encased between a pair of mold parts forming a cavity at the edges. This cavity is filled with liquid polyurethane that is allowed to cure, whereupon the mold is open. While this system does produce a very neat and strong joint, it makes it virtually impossible to replace the glass if necessary. Thus if the glass is broken, an entire new frame assembly is needed.

A partial solution to this problem is seen in German patent document 195 26 283 of J. Siebold. It provides separate seal strips on the window and frame edge and uses screws to secure the two parts together. This arrangement is fairly complex and the seal is often inadequate. Furthermore the parts are difficult to assemble.

OBJECTS OF THE INVENTION

It is therefore an object of the present invention to provide an improved motor-vehicle glass-mount assembly.

Another object is the provision of such an improved motor-vehicle glass-mount assembly which overcomes the above-given disadvantages, that is which is simple to install and repair and that provides a very tight seal.

SUMMARY OF THE INVENTION

An outside edge of a glass pane and a coextensive inside edge of a frame are connected together according to the invention by a glass-mount assembly having according to the invention a T-section outer seal strip fixed to an inner face one of the edges and having an inwardly projecting T-leg and a U-section inner seal strip fixed to the other of the edges and forming an outwardly open groove snugly receiving the T-leg, and a plurality of screw fasteners each having a part bearing outward on the inner seal strip and a shank engaged in the T-leg of the inner seal strip.

This system allows the two seal strips to be formed in situ on the glass pane and frame, typically of polyurethane by injection molding. When joined together they interfit so snugly that leakage is impossible due to the labyrinth effect of the interfitting T- and U-shapes. If the pane needs to be replaced, the screws are backed off and the pain with its inner strip is pulled off and replaced with a new part. The seal strips have a shore D hardness of between 40 and 60 so they will deform enough to form a tight seal but still will be strong enough to hold the pane solidly, which is particularly important in a hatch lid that might be slammed.

The outer strip is provided with a plurality of inwardly open threaded sleeves each receiving a respective one of the shanks. These sleeves can be part of one or more metal reinforcement profiles imbedded in the outer strip. Alternately the screw fasteners are self-tapping screws and the outer seal strip is formed with a plurality of inwardly open blind bores each receiving a respective one of the screws. Either way, the inner strip is formed with a plurality of counterbored through-going holes through each of which passes a respective one of the screws. The inner strip can be provided with an imbedded metallic reinforcement through which the screws pass. The outer-strip reinforcement is exposed at an inner face of the T-leg and the self-tapping screws are actually seated in this outer-strip reinforcement. In addition the inner-strip reinforcement is inwardly exposed and directly engaged by the screw parts, normally screw heads.

The screw fasteners each can also include an inwardly projecting threaded stud anchored in the inner strip and a nut threaded on the stud and constituting the respective part.

In another arrangement according to the invention the inside frame edge is turned in and engages around one of the arms of the T-shaped outer seal strip. In this case a gasket strip is engaged between the turned-in inside frame edge and an outer face of the glass pane.

The inside frame edge can be imbedded in one of the T-arms or the outer seal strip can be bonded to an inner face of the outside pane edge. Such bonding is very strong when the seal strips are molded right on the respective edges. The T-leg can be shorter than a groove formed between the legs of the outer seal strip so that a space is formed between an inner face of the T-leg and a floor of the groove. This ensures some compression of the strips for best sealing action.

The inner and outer seal strips according to the invention have aligned inner peripheries. In addition an opaque layer, e.g. of primer, can be provided between an inner face of the outside pane edge and the outer seal strip. For flush glazing the outside pane edge overlaps the inside frame edge, in which case the inside frame edge is offset inward to allow the outer faces of the glass and of the frame to be generally coplanar.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
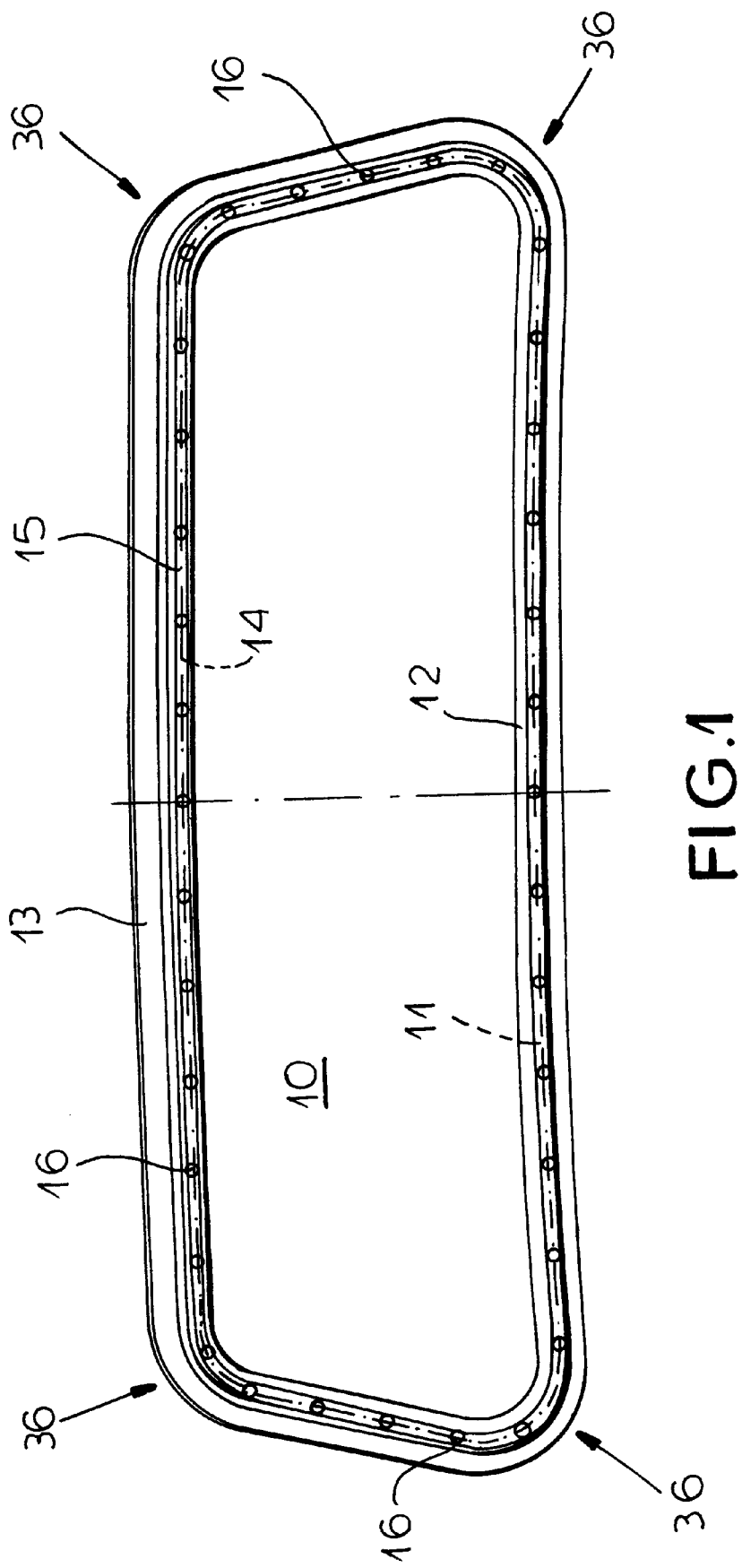
FIG. 1 is a view from inside of a motor-vehicle hatch.

As seen in FIG. 1 a glass pane 10 has an outside edge 11 on which is formed a U-section seal strip 12 fitting with a complementary T-section seal strip 15 mounted on an inside edge 14 of a metallic frame 13. Screws 16 are engaged outward through the seal strip 12 with the seal strip 15 to secure the glass 10 in the frame 13 (The term "inner" and "inward" referring to downward and the terms "outer" and "outward" referring to upward, and the terms "outside" and "inside" respectively referring to leftward and rightward in FIGS. 2 to 9). The strips 12 and 15 are made of relatively stiff polyurethane with a Shore D hardness of between 40 and 60.

Figure 2:
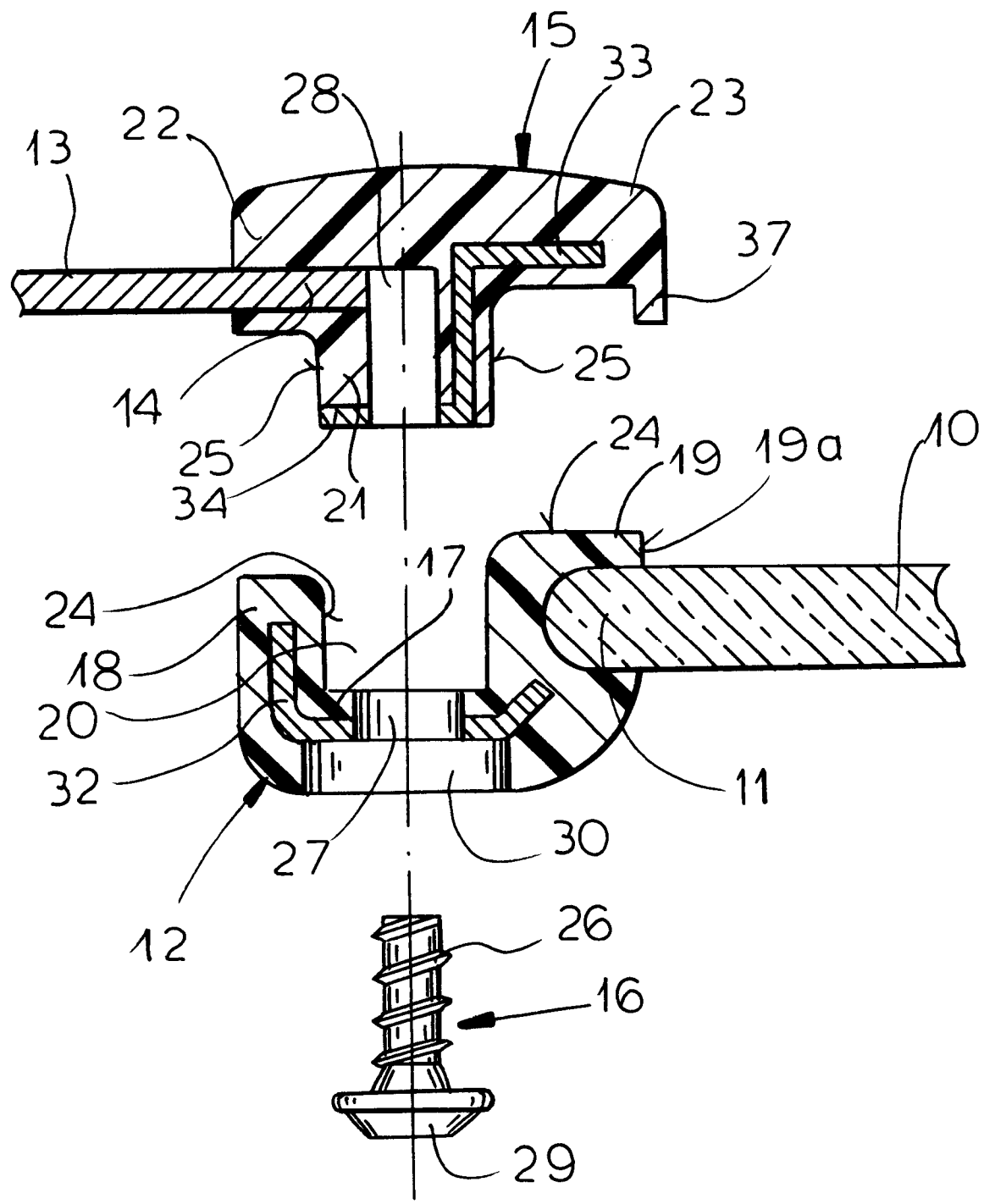
FIG. 2 is an exploded sectional view through the mount assembly of the hatch.
Figure 3:
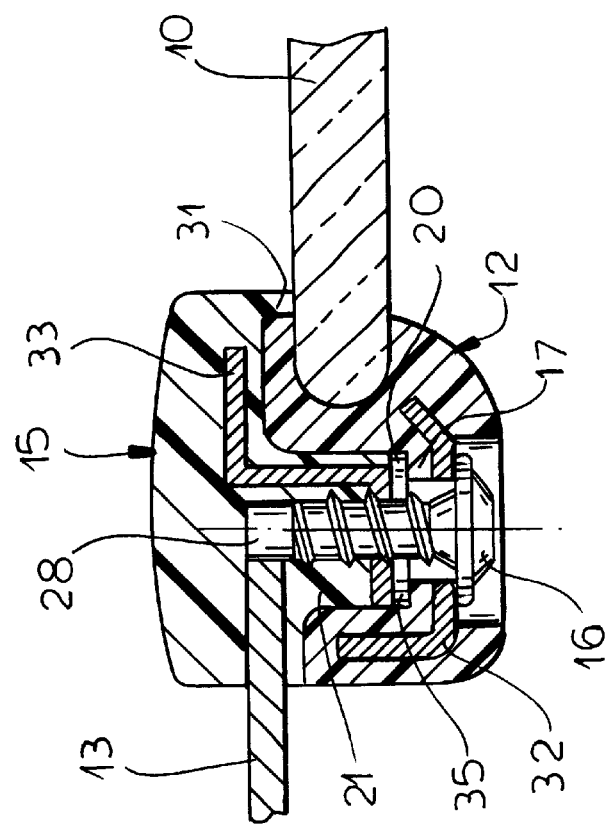
FIG. 3 is a sectional view through the assembly in assembled condition.

As shown in FIGS. 2 and 3 the U-section inner seal strip 12 has a central bight portion 17 flanked by a pair of outwardly projecting inside and outside U-legs 18 and 19 defining an annular outwardly open groove 20. The outer seal strip 15 is of T-section and has a center inwardly projecting T-leg 21 and a pair of T-arms 22 and 23 respectively directed toward the outside and toward the inside. Side surfaces 24 of the groove 20 engage side surfaces 25 of the leg 21 when the two seal strips 12 and 15 are fitted together as shown in FIG. 3.

The screws 16 are of the self-tapping type and each have a threaded shaft 26 engaged with play through a hole 27 in the inner seal strip 12 and fitted in a blind bore 28 of the outer seal strip 15. The screws 16 each also have a head 29 received in a counterbore or recess 30 of the inner seal strip 12.

The outer seal strip 15 has at its inside periphery an inwardly directed lip 31 that engages over an end surface 19a of the leg 19 to directly engage the outer face of the glass 10 so as to form a tight seal therewith and produce with the T-leg 21 and U-groove 20 a labyrinth-seal effect. In addition generally U-section reinforcement strips 32 that are exposed at the floor of the counterbores 30 are imbedded in the straight portions of the seal strip 12. Similarly, Z-section reinforcement strips 33 exposed at 34 at the inner end of the T-leg 21 are imbedded in the leg 21 and arm 23 of the outer seal strip 15. The self-tapping screws 16 are actually threaded in the outer-strip reinforcement 33 for best anchoring of the pane 10. The T-leg 21 is somewhat shorter than the groove 20 so that in assembled condition a space 35 is normally left allowing good compression of the seals 12 and 15 together. Corners 36 of the assembly are free of the reinforcements 32 and 33.

Figure 5:
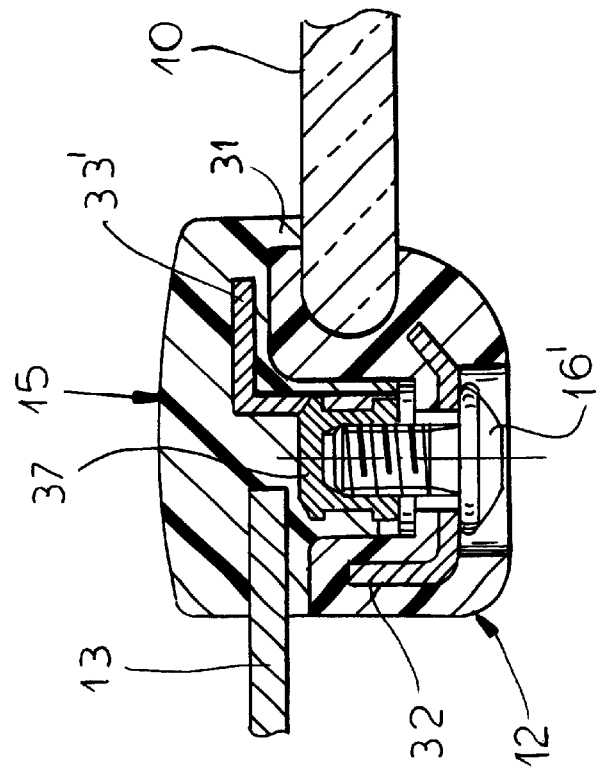
FIGS. 4 and 5, 6 and 7, and 8 and 9 are views like respective FIGS. 2 and 3 of further mount assemblies in accordance with the invention.
Figure 4:
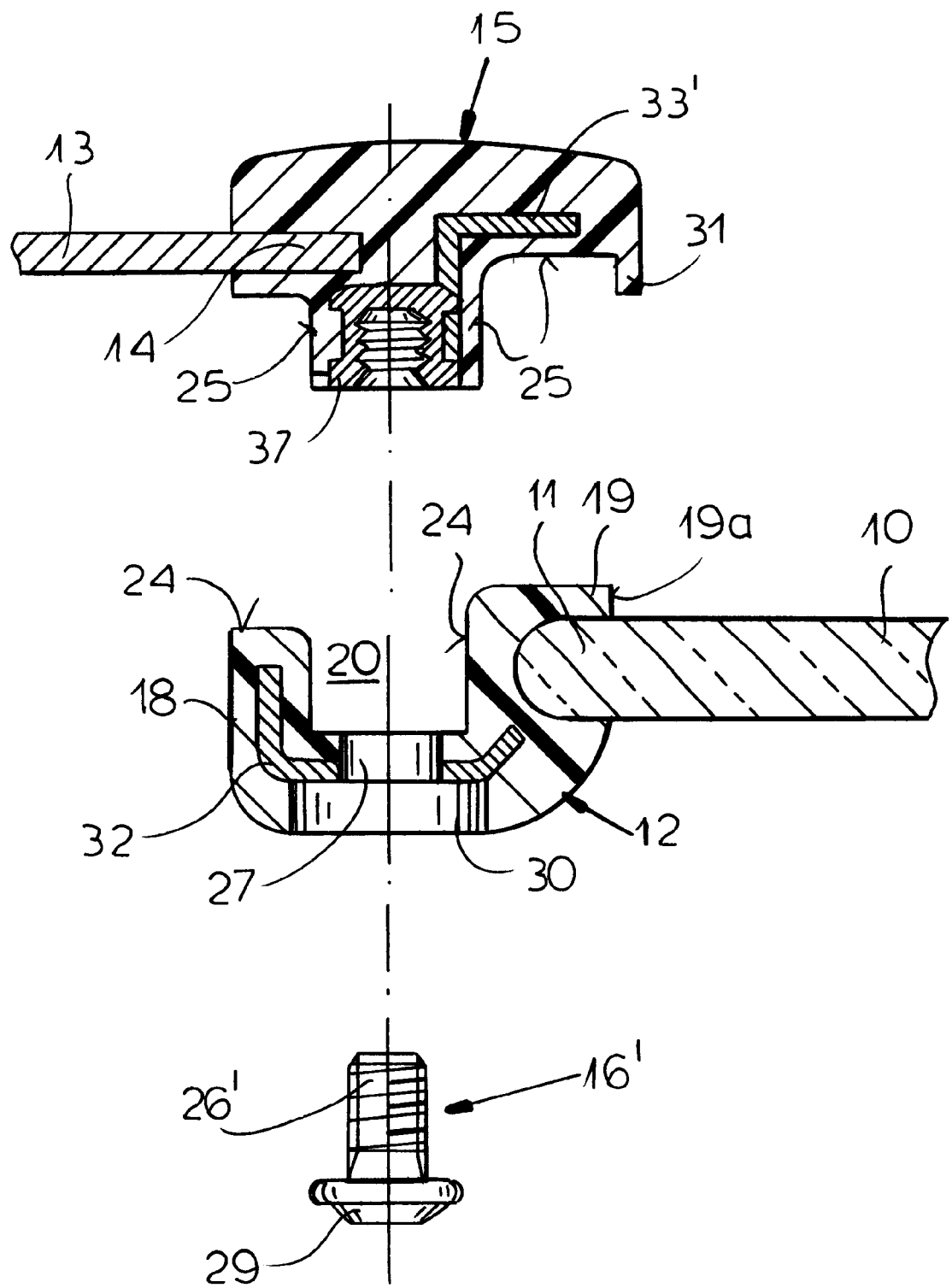

In the arrangement of FIGS. 4 and 5 outer reinforcing strips 33' are provided with threaded sleeves 37 in which are fitted shanks 26' of machine screws 16'.

Figure 6:
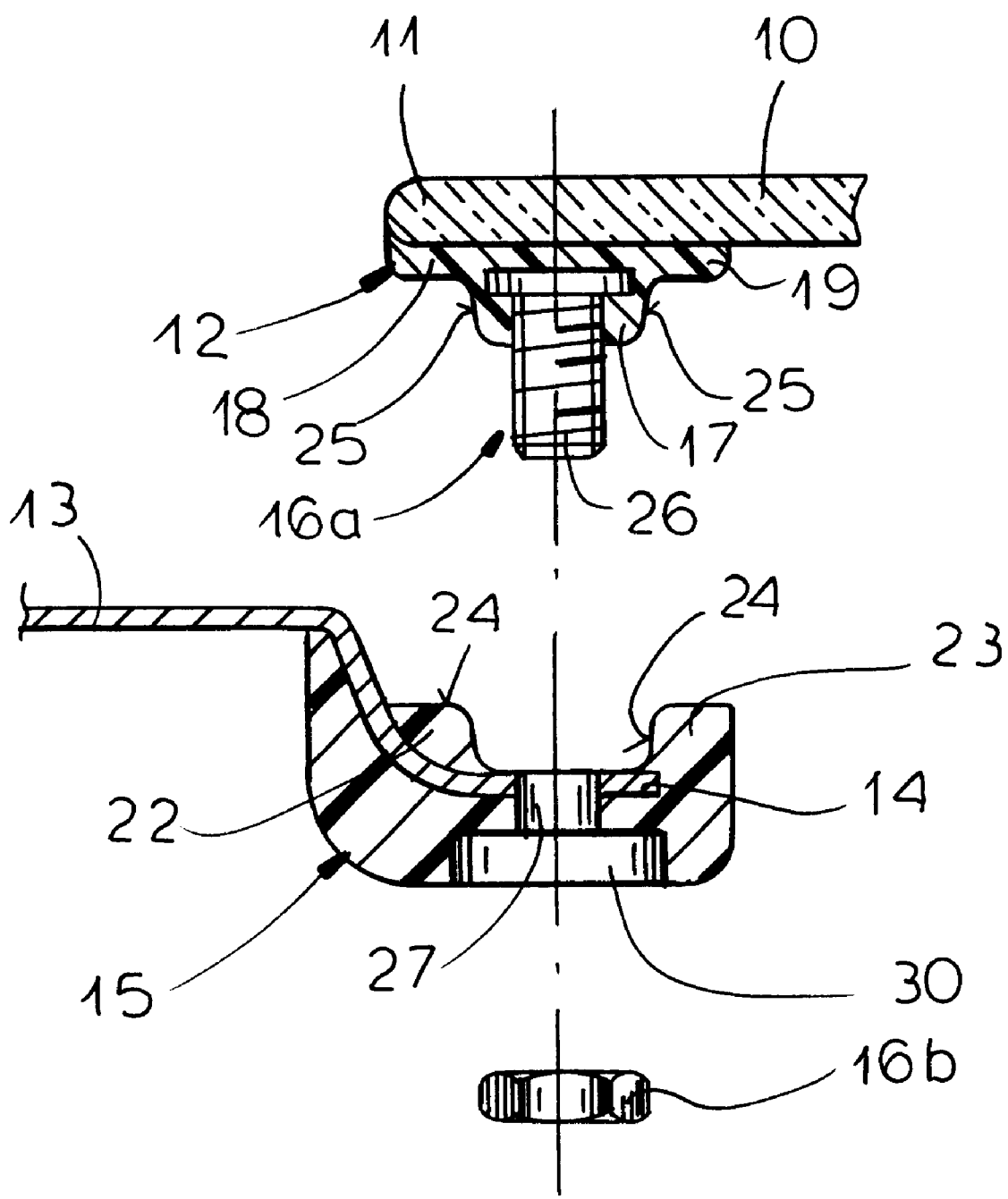
Figure 7:
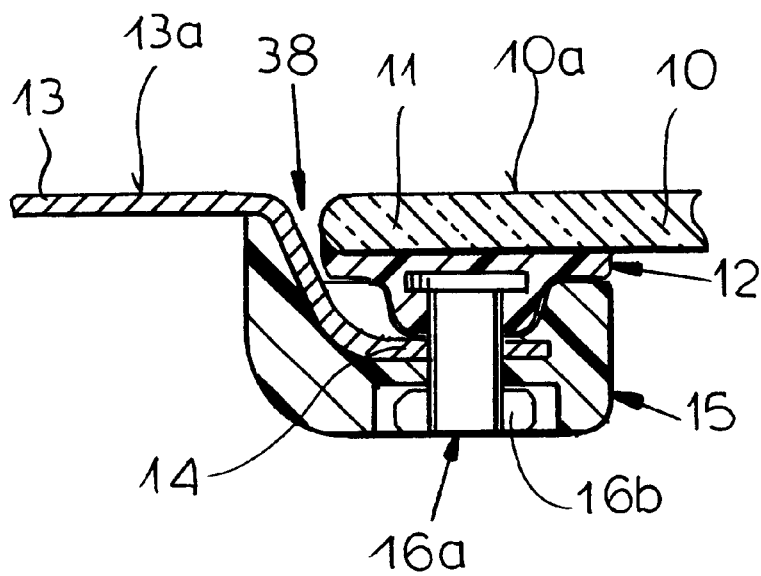

FIGS. 6 and 7 show a T-shaped outer strip 12 that is wholly mounted on the inner face of the edge 11 and that carries a threaded stud 16a that is secured in place by a nut 16b. The edge 14 is offset inward so that in the finished assembly shown in FIG. 7 the outer faces 10a of the glass 10 and 13a of the frame 13 are substantially coplanar, with only a small gap 38 between the glass 10 and frame 13.

Figure 9:
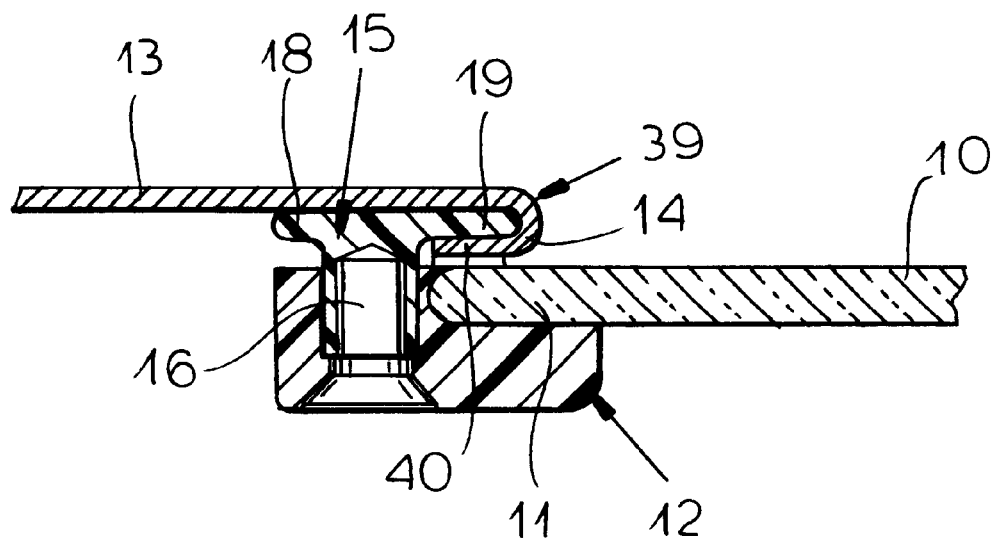
Figure 8:
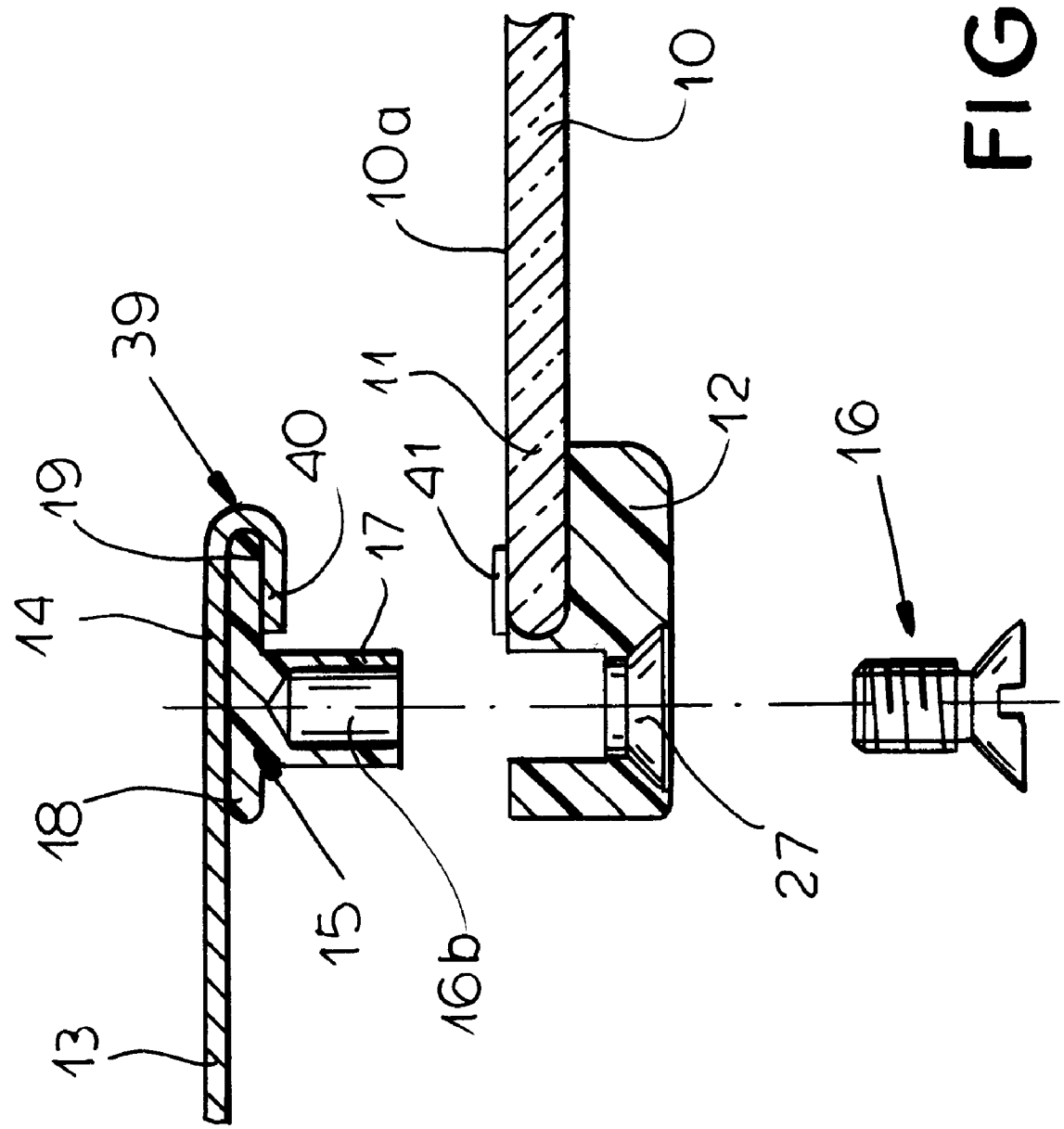

In FIGS. 8 and 9 the inside edge 14 is bent over in a U-shape at 39 to capture the inside arm 19 of the T-shaped outer seal strip 15 which is formed with a blind bore 16b adapted to receive a self-tapping screw 16. In addition the outer face 10a of the glass 10 is provided at the edge 11 with a flat gasket 41 that engages the inner surface 40 of the bent-over edge portion 39.

We claim:

1. In combination with a glass pane having an outside edge and a frame having a generally coextensive inside edge, a glass-mount assembly comprising:

a T-section outer seal strip fixed to an inner face of one of the edges and having an inwardly projecting T-leg;

a U-section inner seal strip fixed to the other of the edges and forming an outwardly open groove snugly receiving the T-leg; and a plurality of screw fasteners each having a part bearing outward on the inner seal strip and a shank engaged in the T-leg of the inner seal strip.

2. The glass-mount assembly defined in claim 1 wherein the seal strips are of polyurethane.

3. The glass-mount assembly defined in claim 1 wherein the seal strips have a shore D hardness of between 40 and 60.

4. The glass-mount assembly defined in claim 1 wherein the outer strip is provided with a plurality of inwardly open threaded sleeves each receiving a respective one of the shanks.

5. The glass-mount assembly defined in claim 4 wherein the outer strip is provided with an imbedded metallic reinforcement formed with the threaded sleeves.

6. The glass-mount assembly defined in claim 1 wherein the screw fasteners are self-tapping screws and the outer seal strip is formed with a plurality of inwardly open blind bores each receiving a respective one of the screws.

7. The glass-mount assembly defined in claim 6 wherein the inner strip is formed with a plurality of counterbored throughgoing holes through each of which passes a respective one of the screws.

8. The glass-mount assembly defined in claim 1 wherein the inner strip is provided with an imbedded metallic reinforcement through which the screws pass.

9. The glass-mount assembly defined in claim 8 wherein the outer strip is provided with an imbedded metallic reinforcement in which the screws are anchored.

10. The glass-mount assembly defined in claim 9 wherein the outer-strip reinforcement is exposed at an inner face of the T-leg.

11. The glass-mount assembly defined in claim 8 wherein the inner-strip reinforcement is inwardly exposed and directly engaged by the screw parts.

12. The glass-mount assembly defined in claim 1 wherein the screw fasteners each include an inwardly projecting threaded stud anchored in the inner strip and a nut threaded on the stud and constituting the respective part.

13. The glass-mount assembly defined in claim 1 wherein the inside frame edge is turned in and engages around one of the T-arms.

14. The glass-mount assembly defined in claim 13, further comprising a gasket strip engaged between the turned-in inside frame edge and an outer face of the glass pane.

15. The glass-mount assembly defined in claim 1 wherein the outer seal strip has a pair of T-arms in one of which is imbedded the inside frame edge.

16. The glass-mount assembly defined in claim 1 wherein the outer seal strip is bonded to an inner face of the outside pane edge.

17. The glass-mount assembly defined in claim 1 wherein the T-leg is shorter than a groove formed between the legs of the outer seal strip, whereby a space is formed between an inner face of the T-leg and a floor of the groove.

18. The glass-mount assembly defined in claim 1 wherein the inner and outer seal strips have aligned inner peripheries.

19. The glass-mount assembly defined in claim 1, further comprising an opaque layer between an inner face of the outside pane edge and the outer seal strip.

20. The glass-mount assembly defined in claim 1 wherein the outside pane edge overlaps the inside frame edge.

* * * * *